No. 834,837. PATENTED OCT. 30, 1906.
H. A. MINER.
AIR BRAKE BLEEDING VALVE.
APPLICATION FILED JUNE 12, 1906.
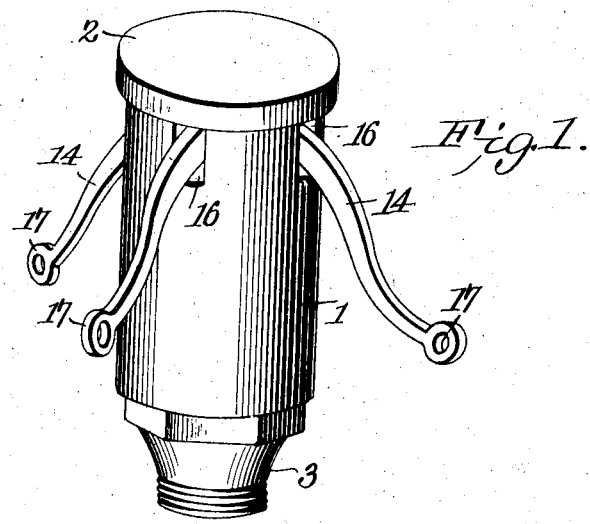
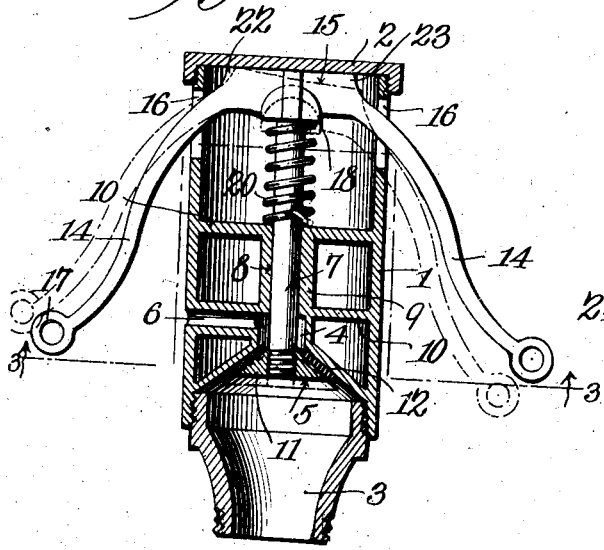
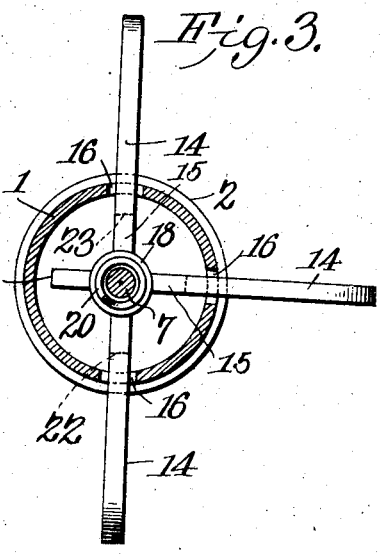
WITNESSES:
Herbert A. Miner, INVENTOR.
By C. A. Snow & Co.
ATTORNEYS

UNITED STATES PATENT OFFICE.

HERBERT A. MINER, OF LOGANSPORT, INDIANA, ASSIGNOR OF ONE-HALF TO CHARLES P. McCAFFREY, OF LOGANSPORT, INDIANA.

AIR-BRAKE BLEEDING-VALVE.

No. 834,837.     Specification of Letters Patent.     Patented Oct. 30, 1906.

Application filed June 12, 1906. Serial No. 321,417.

*To all whom it may concern:*

Be it known that I, HERBERT A. MINER, a citizen of the United States, residing at Logansport, in the county of Cass and State of Indiana, have invented a new and useful Air-Brake Bleeding-Valve, of which the following is a specification.

This invention relates to improvements in air-brake apparatus, and relates more particularly to a bleeding or releasing valve which is capable of being operated from a plurality of more or less remote points.

The objects of the invention are to simplify and improve the construction of this class of devices and to facilitate their operation.

With these objects in view and others, as will appear as the nature of the invention is better understood, the invention comprises the various novel features of construction and arrangement of parts hereinafter set forth, and defined with particularity in the claims appended thereto.

In the accompanying drawings, which illustrate one of the embodiments of the invention, Figure 1 is a perspective view of the valve. Fig. 2 is a central longitudinal section. Fig. 3 is a transverse section on line 3 3 in Fig. 2.

Corresponding parts in the several figures are indicated throughout by similar characters of reference.

Referring to the drawings, 1 designates the valve-casing, which may be and preferably is cylindrical in shape and externally and internally threaded at opposite ends to receive, respectively, a cap 2 and nipple 3, the latter serving to attach the valve to the auxiliary reservoir of the air-brake system or to any other suitable device that is to be controlled by the valve. As shown in Fig. 2, the valve is provided with a passage or port 4 adjacent its nipple end, that is controlled by the valve 5. Extending radially from the passage 4, which latter extends axially of the cylinder, is a vent passage or outlet 6. The valve 5 is provided with a stem 7, which is guided in the bore or cylindrical passage 8 of the guide 9, the guide being supported in the cylinder by the webs 10. The valve 5 comprises a conical nut 11, which is bored and tapped to screw on the threaded end of the valve-stem and is adapted to engage a conical seat 12, arranged at the nipple end of the cylinder, a frusto-conical gasket of rubber or other material being arranged on the valve to face the same where it engages the seat.

The valve is adapted to be actuated by a tripod or stool-like actuator. This comprises a plurality of legs or levers 14, connected together at their inner ends by the cross-bar portions 15. In the present illustration three levers are shown arranged at ninety degrees apart and extending through correspondingly-arranged slots 16 in the wall of the casing 1 near the cap 2 thereof. These slots are of sufficient length to permit the levers to be moved back and forth therein to their full extent. The cap 2 serves as an abutment for the actuator, and the latter is adapted to be tilted on the same. The ends of the levers 14 are provided with eyes 17, by which the actuator is attached to a plurality of rods or other connecting means (not shown) that may be arranged so that the valve can be operated from the sides and top of the car.

To connect the actuator with the valve, the stem 7 of the latter extends upwardly toward the end of the casing 1 and is provided with a hemispherical enlargement 18, that engages in a correspondingly-shaped socket in the cross-bars 15 of the levers. This enlargement permits of the actuator being tilted in any direction about the same as a center. The enlargement also serves as an abutment for receiving one end of the compression-spring 20. This spring is arranged around the valve-stem and abuts at the end opposite from the enlargement on the upper end of the valve-stem guide 9. The spring is normally under sufficient tension to maintain the valve tightly on the seat, so as to prevent leakage. To assist in preventing leakage, the end of the valve exposed to the pressure within the auxiliary reservoir of the brake system is of substantial dimensions, so that said pressure acting on the valve aids materially in keeping the latter seated. Since the actuator abuts the cap 2 and the valve-stem engages with the actuator, the set of the cap 2 must be so determined as to permit the valve to seat. This can be readily done, since the cap is adjustable on the cylinder by means of its screwing thereon.

When the parts are in the positions shown by full lines, the valve is closed. When it is desired to open the valve, any one of the rods connected with the actuator may be moved, the rods having such a movement as to tilt the lever connected with the rod that the operator is actuating in a downward direction. Assuming that the right-hand lever in Fig. 2 has been moved to open the valve, the parts will then occupy the positions shown by dotted lines. It will be noted that the left-hand end of the bar to which the lever is attached serves as a fulcrum on which the whole actuator moves, the fulcrum being indicated at 22. Had the left-hand lever been moved by the actuating-rod attached to it the fulcrum of the actuator would be at the point indicated at 23. If the centrally-projecting lever in Fig. 3 were actuated, the fulcrum of the actuator would be at the point designated 24, the cross-bar of the lever being extended to the opposite side of the enlargement 18, so as to have the fulcrum-point at a suitable distance from the latter to afford sufficient leverage. It will thus be seen that the actuator operates as a wabbler that can be actuated from a number of different points to impart a single movement—viz., the longitudinal movement of the valve-stem.

I have described the invention as a bleeding or releasing valve to be used in connection with an air-brake system; but it is obvious that the same is applicable to other cases where it is desired to control fluid-pressure from one or more suitably remote points.

Furthermore, I have described the principle of operation of the invention, together with the apparatus which I now consider to be the best embodiment thereof; but I desire to have it understood that the apparatus shown is merely illustrative and that various changes may be made when desired as are within the scope of the invention.

What is claimed is—

1. The combination of a casing, a port therein, a valve controlling the port, and a tiltable member mounted partly within and partly without the casing to actuate the valve in an axial direction and adapted to be operated by independent actuating means.

2. The combination of a casing, a port therein, an actuator within the casing which is mounted for a wabbling movement and having members extending loosely through the wall of the casing, a valve for the port controlled by the actuator, an adjustable abutment for the actuator to fulcrum on, and means tending to hold the valve on its seat and the actuator on the abutment.

3. The combination with a casing, a port therein, a valve controlling the port, a stem for the valve, a single-piece actuator mounted for a wabbling movement which engages the stem and is provided with a number of radially-disposed levers, a stationary member on which the actuator tilts at a number of different points, and means for guiding the movement of the valve-stem.

4. The combination of a casing, a port therein, a valve controlling the port, an actuator engaging the valve and mounted for a wabbling movement, and means on which the actuator fulcrums.

5. The combination of a casing, a port therein, a valve controlling the port, a valve-stem, a tiltable actuator within the casing engaging the stem for opening the valve and having arms projecting out of the casing, an abutment on which the actuator tilts, and a spring arranged to close the valve and maintain the actuator in engagement with the abutment.

6. The combination of a casing, a port therein, a valve controlling the port, a valve-stem, a tiltable actuator engaging the stem for opening the valve, a removable cap closing one end of the casing and disposed over the actuator to form an abutment on which the actuator tilts, and a spring arranged on the valve-stem to normally maintain the valve closed and the actuator against the abutment.

7. The combination of a casing, a port therein, a valve controlling the port, a valve-stem, a tiltable actuator, a universal connection between the stem and actuator, an abutment for receiving the thrust of the actuator, and a spring arranged to return the actuator and valve.

8. The combination of a casing, a port therein, a valve controlling the port, a valve-stem provided with an enlargement, a guide for the stem, a spring on the stem confined between the enlargement and guide, an actuator in the casing which engages the enlargement, and an adjustable cap on the casing abutting the actuator.

9. The combination of a casing provided with a plurality of slots, an actuator mounted in the casing with members extending through the slots for engagement with independent controlling mechanisms, a port in the casing, a valve controlling the port, and means for connecting the actuator with the valve.

10. The combination of a casing provided with a plurality of slots, levers extending through the slots and rigidly connected, a cap threaded on the casing to serve as an abutment for the levers, a valve in the casing, and means for actuating the valve by any of the levers.

11. The combination of a support provided with an abutment, an actuator having a plurality of differently-located fulcrum-points which are arranged to permit of a wabbling movement, a member arranged to be moved by the actuator, and a yielding means for holding the actuator in engagement with the abutment and permitting it to tilt on any of its fulcrums.

12. The combination of a casing, a longitudinally-movable member having a terminal enlargement, a guide on the casing for the said member, an actuator for the member which engages the enlargement thereof, a spring arranged with its ends abutting the guide and enlargement to operate through the member to oppose the movement of the actuator, and an abutment on the casing which engages the actuator and operates through the same to hold the spring under tension.

In testimony that I claim the foregoing as my own I have hereto affixed my signature in the presence of two witnesses.

HERBERT A. MINER.

Witnesses:
OSCAR B. CONANT,
DUDLEY P. SWIGART.